UNITED STATES PATENT OFFICE 2,622,965

PRODUCTION OF PHOSPHORUS COMPOUNDS

Calvin M. Tidwell, East Point, Ga., assignor to International Minerals and Chemical Corporation, a corporation of New York No Drawing. Application September 8, 1947, Serial No. 772,891

5 Claims. (Cl. 23—203)

The present invention relates to an improved process for the production of phosphorus-halogen and phosphorus-oxygen-halogen compounds. More particularly the present invention relates to an improved process for the production of phosphorus oxychloride and phosphorus chlorides.

Phosphorus oxyhalides and phosphorus halides are well known in the chemical arts as useful reactants or reagents in numerous chemical processes. It has been the prior practice to manufacture such compounds by means of various methods among which can be mentioned the halogenation of either crude or refined phosphate rock (apatite, fluorapatite) at elevated temperatures usually in excess of 500° C., with or without the addition of carbon or carbonaceous reducing agents. Various halogenation catalysts have also been added to the reactants, for example halides of zinc, aluminum and iron. It has also been proposed to prepare phosphorus oxyhalides and phosphorus halides by means of reacting the aforementioned phosphatic materials with halogenation reagents in which the halogen is in a more reactive form than in the case of the respective halogens themselves. Among such halogenation reagents which have been previously proposed may be mentioned phosgene ($COCl_2$), thionyl chloride and others. While such reagents may enable the process to be conducted at a lower tempertaure than when employing molecular halogen, such processes are not advantageous due to the increased costs of producing the final products. Furthermore, all of the aforementioned halogenation processes suffer from a common defect in that the phosphate rock or phosphatic mineral material becomes rapidly coated with a calcium-halogen compound which prevents further reaction of the phosphatic material with the halogenating reagent, resulting in poor yields of the desired products. It has therefore frequently been necessary to stop such halogenation reactions at convenient intervals in order to expose a fresh surface of phosphatic material to the action of the halogenating reagent, which is accomplished either by leaching out the calcium-halogen compounds (the majority of these being water soluble) or by crushing the partially halogenated phosphatic material and subjecting it to a further action by the halogenating reagents. All of these intermediate steps necessarily complicate the process, increase the cost, and reduce the yields of the desired phosphorus oxyhalide and the phosphorus halide compounds to an important degree. It has also been previously proposed to prepare phosphorus oxychloride by a reaction which comprises passing phosgene into molten metaphosphoric acid at elevated temperatures, such as between about 300° and 400° C. This process suffers from the previously mentioned defects in that a highly specialized type of halogenating reagent must be employed, which adds to the cost of the process.

It is an object of the present invention to provide an improved process for the production of phosphorus oxyhalide and phosphorus halide compounds by means of a simpler and more efficient method than has heretofore been employed.

It is a further object of this invention to provide an improved process for the production of phosphorus oxychloride by means of a simpler and more efficient method than has heretofore been employed.

It is a further object of this invention to provide a method for an improved process for the production of phosphorus oxychloride and phosphorus chlorides whereby the phosphorus content of the phosphatic reactant is recovered as phosphorus oxychloride and phosphorus chlorides in higher yields than has been achieved in prior processes.

It is a further object of this invention to provide an improved process whereby phosphorus oxychloride and phosphorus chlorides may be produced from a phosphatic material while obviating the necessity of employing complex and expensive chlorination reagents.

Further objects of the invention will become apparent upon a more complete understanding of the instant novel process as hereinafter more fully described.

The above objects are accomplished by employing the instant novel process which in general comprises treating an acid of phosphorus or a composition containing at least one acid of phosphorus with chlorine at a temperature in excess of 250° C. in the presence of activated carbon or certain carbonaceous materials. The acids of phosphorus which may be employed in the instant process include orthophosphoric acid, metaphosphoric acid, pyrophosphoric acid and mixtures of such acids. The activated carbon or carbonaceous material which is an essential reactant may be present either in a finely divided form or in solid form of varying particle size and may be derived from numerous sources which will be herein further described. The temperature at which the halogenation reaction is carried out may vary between about 250° C. and about 600° C., but the desired reaction products may be obtained by employing still higher temperatures, although the product yields may be somewhat reduced in such cases.

More particularly the instant novel process is conducted by heating at least one acid of phosphorus admixed with activated carbon or other suitable carbonaceous materials at temperatures in excess of 250° C., preferably at temperatures between about 400° C. and about 500° C., in the presence of chlorine. Any of the acids of phosphorus mentioned in the previous paragraph or mixtures thereof may be used as the phosphatic reagent. The word "carbon" as used herein and as used in the appended claims is meant to include the various forms of activated carbons which are familiar to the chemical arts such as those derived from charcoal, coke, bone black, lamp black, etc. by conventional procedures, and it is also intended to include by such term all carbonaceous materials which will form carbon under the reaction conditions obtaining. As examples of such carbonaceous materials may be mentioned sawdust, pitch derived from either petroleum or coal sources, peat, asphalt, sugars, lignin, high-boiling naphthenic and aromatic petroleum fractions, etc. The carbon or carbonaceous material may be mixed with the acids of phosphorus either prior to the halogenation reaction or may be admitted into a reaction chamber containing said acids simultaneously with the halogenation reactant.

The ratios of acids of phosphorus, chlorine and carbon may be varied over a fairly wide range, but ratios of acids of phosphorus to chlorine of about 1 part by weight of total acid of phosphorus to between about 0.5 and about 3.0 parts by weight of chlorine are preferably employed. Similarly a ratio of carbon to acids of phosphorus is preferably maintained at between about 0.5 and about 5.0 parts by weight of said carbon per part of phosphorus. The optimum feed to the chlorination reaction zone contains acids of phosphorus of about 30%, calculated as $P_2O_5$ and about 70% activated carbon or carbonaceous material. Feeds containing over 40% $P_2O_5$, while satisfactory in a batch-type process, are to be avoided in continuous processes since the gummy character of same leads to mechanical difficulties.

Where the acid of phosphorus contains water of hydration (orthophosphoric acid) or excess moisture, and where the activated carbon or carbonaceous material contains moisture, it is essential to remove substantially all of this moisture prior to halogenation reaction since the moisture evolved during said reaction would react with the desired products to form phosphoric acid and hydrogen halide in amounts dependent upon the initial moisture content of the reactants. In such cases, the reactants should be preheated, either separately or when admixed, to remove substantially all of the moisture prior to the halogenation reaction.

The instant novel process may be conducted by either batch or continuous procedures. Thus appropriate amounts of acids of phosphorus, carbon, and halogen may be charged to a suitable reaction vessel which may be sealed in order to retain the resultant gaseous reaction products, and the reactants may then be heated at temperatures of between about 250° C. and about 600° C. until the phosphorus which was formerly present in the acids of phosphorus has been substantially converted into phosphorus oxyhalide or phosphorus halides. Alternatively acids of phosphorus, halogen and carbon or carbonaceous material may be continuously passed separately or simultaneously into a suitable type of reaction vessel at the aforementioned temperatures, and the resultant gaseous reaction products condensed by means of any suitable type of condensing apparatus. The gases which are not condensed which include chlorine, hydrogen chloride, carbon dioxide, and in cases where carbonaceous reactants other than activated carbon are employed, various chlorinated compositions of unknown structure may be recirculated through the reaction zone thereby affording an optimum utilization of the halogenation reagent. Any carbon or carbonaceous reactant which remains after the $P_2O_5$ content of the reaction mixture has been substantially exhausted by halogenation may be reused, or, in case of a continuous type process, may be recirculated with more acid of phosphorus through the reaction zone.

The condensed reaction products which are usually liquids or solids are processed to recover the phosphorus oxyhalide or phosphorus halide components in accordance with procedures well known in the chemical art; for example by fractional distillation at either atmospheric or reduced pressure.

In order to afford a more complete understanding of the invention but with no intention of being limited thereby, the following examples are given:

*Example I*

About 86 g. of a mixture of metaphosphoric acid and activated carbon with a total phosphorus content equivalent to about 23.5 g. of $P_2O_5$ was placed in an acid resistant reaction vessel, equipped with gas inlet and outlet tube, said vessel being immersed in a fusion type salt bath. Chlorine was passed through the reaction mixture at a temperature of about 400° C. for a period of about 2 hrs. at a rate of about 200 ml. of gas per minute (atmospheric pressure). At the end of this time the residue in the reaction vessel contained phosphorus equivalent to about 1.1 g. of $P_2O_5$. Thus about 95% of the phosphorus content of the metaphosphoric acid entered into the reaction. The gaseous reaction products were condensed by means of coils surrounded by cold water, and the liquid condensate contained a total of about 90% of phosphorus oxychloride and phosphorus chlorides, based upon the phosphorus content of the metaphosphoric acid.

*Example II*

A mixture of moisture-free sawdust and orthophosphoric acid containing phosphorus equivalent to about 9.2 g. of $P_2O_5$ was dried at a temperature of about 465° C. and then reacted for about four and one-half hours at a temperature of about 465° C. in the presence of an excess of chlorine. The condensate which was collected as described in Example I contained phosphorus oxychloride and phosphorus chlorides equivalent to about 5.7 g. of $P_2O_5$. Thus approximately 62% of the phosphorus content of the orthopsheric acid is present in the reaction products as phosphorus oxychloride and phosphorus chlorides.

*Example III*

A reaction similar to that described in Example II was carried out at a temperature of about 500° C. In this particular case a conversion of about 80% of the phosphorus content of the orthophosphoric acid to phosphorus oxychloride and phosphorus chlorides was obtained.

While the examples recited above refer specifically to the production of phosphorus oxychloride and/or phosphorus chlorides it is to be understood that the instant novel process is also applicable to the production of phosphorus oxybromide or phosphorus bromides by substituting bromine as the halogenated reagent.

As exemplified in Example II above, the instant novel process also contemplates a preliminary heating of acids of phosphorus together with the carbon or carbonaceous reactant at elevated temperatures, preferably between about 300° and about 500° C. prior to the halogenation step as well as instituting the halogenation without such preliminary heating period as previously described.

Obviously the invention is not limited to the procedural details stated but may be carried out while employing extensions and modifications of the factors recited.

What is desired to be secured by Letters Patent is:

1. The process which comprises heating a mixture containing orthophosphoric acid and at least one activated carbonaceous material selected from the group consisting of sawdust and activated carbon, at a temperature between about 300° and about 500° C.; subsequently heating the resulting mixture with chlorine under substantially anhydrous conditions, at a temperature between about 250° and about 600° C., and recovering phosphorus oxychloride from the reaction products.

2. The process which comprises heating at least one acid of phosphorus with chlorine, under substantially anhydrous conditions, in a ratio of about 1.0 part by weight of the acid to between about 0.5 and about 3.0 parts by weight of chlorine, at a temperature between about 250° and about 600° C. and in the presence of activated carbonaceous material in an amount equivalent to between about 0.5 and about 5.0 parts by weight of activated carbonaceous material per part of phosphorus, and separating phosphorus oxychloride from the reaction products.

3. The process which comprises heating a mixture containing about 1.0 part by weight of metaphosphoric acid, and between about 1.0 and about 2.0 parts by weight of chlorine, and about 2.0 parts by weight of activated carbon, at a temperature between about 400° and about 500° C. and under substantially anhydrous conditions, and recovering phosphorus oxychloride from the reaction products.

4. The process which comprises heating a mixture containing about 1.0 part by weight of pyrophosphoric acid, and between about 1.0 and about 2.0 parts by weight of chlorine, and about 2.0 parts by weight of at least one carbonaceous material selected from the group consisting of activated carbon and sawdust, at a temperature between about 400° and about 500° C. and under substantially anhydrous conditions, and recovering phosphorus oxychloride from the reaction products.

5. The process which comprises heating a mixture containing at least one acid of phosphorus and at least one carbonaceous material selected from the group consisting of sawdust and activated carbon at a temperature of between about 300° C. and about 500° C., subsequently heating the resulting mixture with chlorine, under substantially anhydrous conditions, at a temperature of between about 250° C. and about 600° C., and recovering phosphorus oxychloride from the reaction products.

CALVIN M. TIDWELL.

REFERENCES CITED

The following references are of record in the file of this patent:

UNITED STATES PATENTS

| Number | Name | Date |
| --- | --- | --- |
| 1,381,783 | Bartleson | June 14, 1921 |

FOREIGN PATENTS

| Number | Country | Date |
| --- | --- | --- |
| 336,065 | Great Britain | Oct. 9, 1930 |
| 916,084 | Great Britain | Sept. 10, 1934 |